United States Patent

Stivers et al.

[11] Patent Number: 6,138,447
[45] Date of Patent: Oct. 31, 2000

[54] HARVESTING PLATFORM WITH NON-BINDING REEL MOUNT

[75] Inventors: Michelle Lynn Stivers, Davenport, Iowa; Gordon Lee Salley, Moline, Ill.

[73] Assignee: Deere & Company, Moline, Ill.

[21] Appl. No.: 09/321,815

[22] Filed: May 28, 1999

[51] Int. Cl.$^7$ .................................................. A01D 57/04
[52] U.S. Cl. ............................. 56/221; 56/128; 56/14.4; 56/220
[58] Field of Search .................................. 56/14.3, 14.4, 56/128, 219, 220, 221, 226, 227; 403/220, 225, 226

[56] References Cited

U.S. PATENT DOCUMENTS

| | | | |
|---|---|---|---|
| 2,795,920 | 6/1957 | Steuerwald | 56/221 |
| 4,280,318 | 7/1981 | Koch | 56/221 |
| 4,368,609 | 1/1983 | Hutchinson et al. | 56/221 |
| 5,261,216 | 11/1993 | Schumacher, II et al. | 56/14.4 |
| 5,768,870 | 6/1998 | Talbot et al. | 56/221 |
| 5,867,972 | 2/1999 | Laumann et al. | 56/221 |

FOREIGN PATENT DOCUMENTS

| | | | |
|---|---|---|---|
| 2094393 | 6/1954 | United Kingdom | 403/220 |
| 710244 | 6/1954 | United Kingdom | 403/220 |

OTHER PUBLICATIONS

Industrial Hydraulic Technology, Second Edition, Parker Hannifin Corporation, Bulletin 0232–B1, Oct. 1997.

Robert Iredell, "Elastic Rubber Cushion Springs", Product Engineering, pp. 119–123, Mar. 1952.

*Primary Examiner*—Thomas B. Will
*Assistant Examiner*—Nathan Mammen

[57] ABSTRACT

A non-binding reel mount for a harvester platform includes added clearance between the sidewalls of a reel mounting bracket and the reel lifting arms. Side bushings are provided between the brackets and the arms at the center of the arms to prevent lateral motion of the brackets relative to the arms but enable twisting or rotation of the brackets relative to the arms. The non-binding reel mount thus enables one lift cylinder to be fully extended without causing binding between the reel mounting brackets and the reel support arms during a cylinder charging operation. The reel mount can be designed to provide the desired amount of vertical adjustment to the reel. In an alternative embodiment, a single bushing is provided at the top of the support arm that extends between the two sidewalls of the mounting bracket and wraps around the upper corners of the support arm to prevent lateral shifting while permitting rotation of the mounting bracket on the support arm.

11 Claims, 4 Drawing Sheets

HARVESTING PLATFORM WITH NON-BINDING REEL MOUNT

BACKGROUND OF THE INVENTION

1. Field of the Invention

The present invention relates to a harvesting platform having a reel and in particular to a non-binding reel mount that enables one end of the reel to be raised relative to the other end without binding of the reel mount when the hydraulic reel lift cylinders are being charged with hydraulic fluid.

2. Description of Related Art

Harvesting platforms for combines typically have reel support arms pivotally mounted at each end of the platform. The reel support arms are vertically moved by hydraulic lift cylinders to raise and lower the reel, as needed, for various crops and crop conditions. In addition, the reel is moveable fore and aft along the length of the support arms to further adjust the reel position. The reel support arms are typically formed of a rectangular tube. A reel mounting bracket is supported on each arm and includes a generally U-shaped structure having a top wall and sidewalls surrounding the reel support arms. The mounting brackets carry a bearing assembly to rotatably support the reel.

A slide bushing is placed between the top surface of the reel support arms and the reel mounting brackets to facilitate fore and aft sliding motion of the brackets on the reel support arms. The sidewalls of the reel mounting brackets are closely spaced from the side surfaces of the reel support arms to prevent lateral movement of the reel relative to the support arms.

The hydraulic cylinders that raise and lower the reel support arms typically include a controlling cylinder at one support arm and a controlled cylinder at the other support arm, commonly known as master and slave cylinders. During initial charging, i.e. filling, of the cylinders with hydraulic fluid, the controlling cylinder will fill and fully extend before the controlled cylinder begins to fill and extend. The reel support arm coupled to the controlling cylinder will rise while the other reel support arm coupled to the controlled cylinder remains in a lowermost position. The result of raising one reel support arm without raising the other is a twisting or rotation of the mounting brackets relative to the support arms. A limited amount of twisting of the mounting brackets is permitted before the mounting brackets bind on the support arms. Damage can result if the one reel end is lifted further.

SUMMARY OF THE INVENTION

It is an object of the present invention to provide a reel mount that is non-binding when one cylinder is lifted during initial cylinder charging.

It is a feature of the present invention that by providing a non-binding reel mount, greater reel lift can be designed into the platform, enabling taller crops to be harvested with the platform and to provide greater clearance under the reel for platform service operations.

The present invention provides a reel mount that includes a side bushing between each side surface of the reel support arm and the adjacent sidewall of the reel mounting bracket. The side bushings are placed generally at the center of the reel support arms and extend longitudinally of the reel support arm. The side bushings enable the reel mounting bracket to be made larger, with greater clearance between the mounting bracket sidewalls and the side surfaces of the reel support arms. With the side bushings, the mounting brackets are able to rotate relative to the reel support arms and utilize the greater clearance between the bracket sidewalls and the support arms without binding. The side bushings provide support to prevent lateral shifting of the mounting brackets on the reel support arms.

An alternative embodiment includes a larger top bushing that has corner portions that extend downward slightly along the two sides of the support arm. The bushing provides lateral support while enabling the support arm to rotate about an axis near the top of the support arm instead of near the center.

DESCRIPTION OF THE PREFERRED EMBODIMENT

Figure 1:
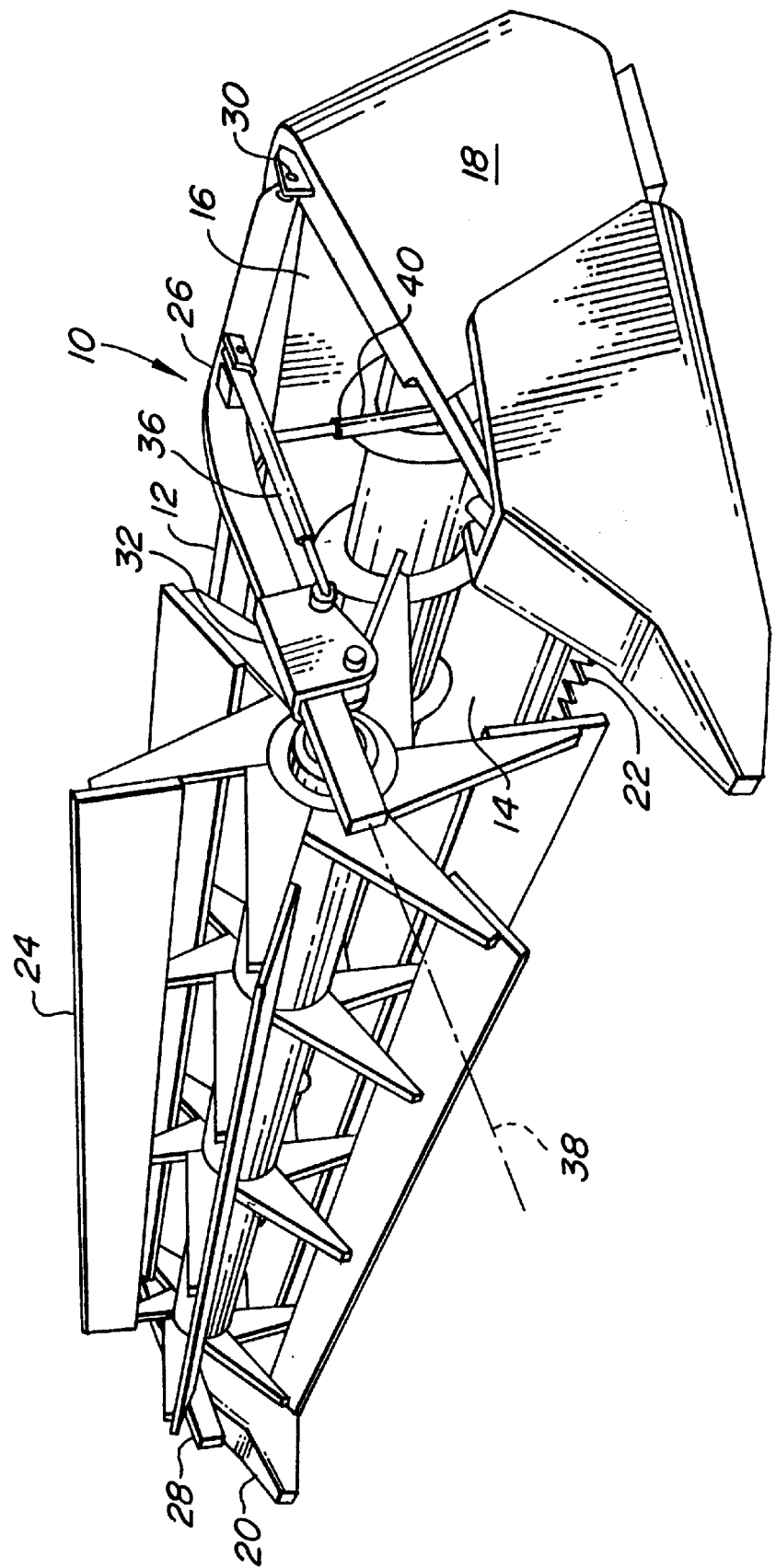
FIG. 1 is a perspective view of the harvesting platform with the non-binding reel mounts according to the present invention.
Figure 2:
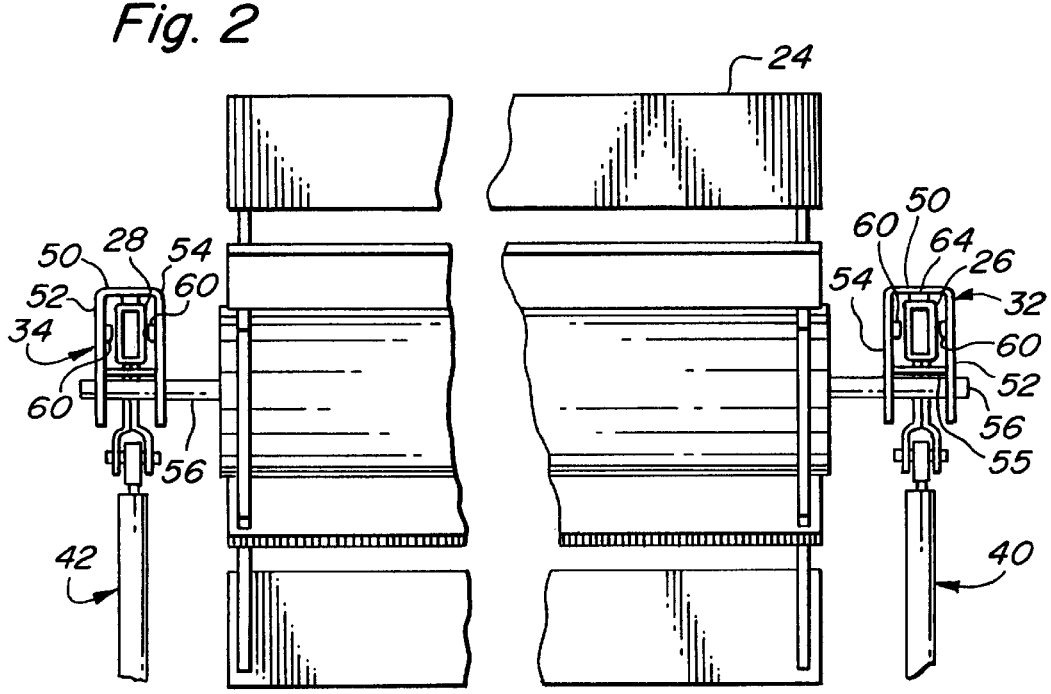
FIG. 2 is a front schematic view of the platform illustrating the non-binding reel mounts of the present invention.

The non-binding reel mount of the present invention is embodied in the grain cutting platform 10 shown in FIG. 1. The platform 10 includes a frame, generally indicated at 12, a floor 14, a rear wall 16 and side sheets 18, 20 at opposite ends of the platform. A cutterbar 22 is provided at the forward edge of the floor 14 for cutting a crop. A reel 24 rotates above the cutterbar to hold crop material against the cutterbar.

The reel 24 is mounted to the platform frame on a pair of reel support arms 26, 28 rotatably mounted to the platform frame 12 by pins 30 at each end of the platform. Reel mounting brackets 32, 34 are provided on each of the reel support arms. Hydraulic cylinders 36, only one of which is shown, are used to move the reel mounting brackets 32, 34 longitudinally along the axis 38 of the reel support arms.

Hydraulic lift cylinders 40, 42 are provided between the platform frame 12 and the reel support arms 26, 28, respectively, to lift the reel by rotation of the arms about the pins 30. The lift cylinder 40 is a controlling cylinder while the lift cylinder 42 is a controlled cylinder. During initial filling or charging of the cylinders with hydraulic fluid, the controlling cylinder will fill first and fully extend before the controlled cylinder 42 begins to fill and extend. As a result, the reel support arm 26 will rise to the full height before the reel support arm 28 will begin to lift. This results in a tilting of the reel as shown in FIG. 3.

Figure 3:
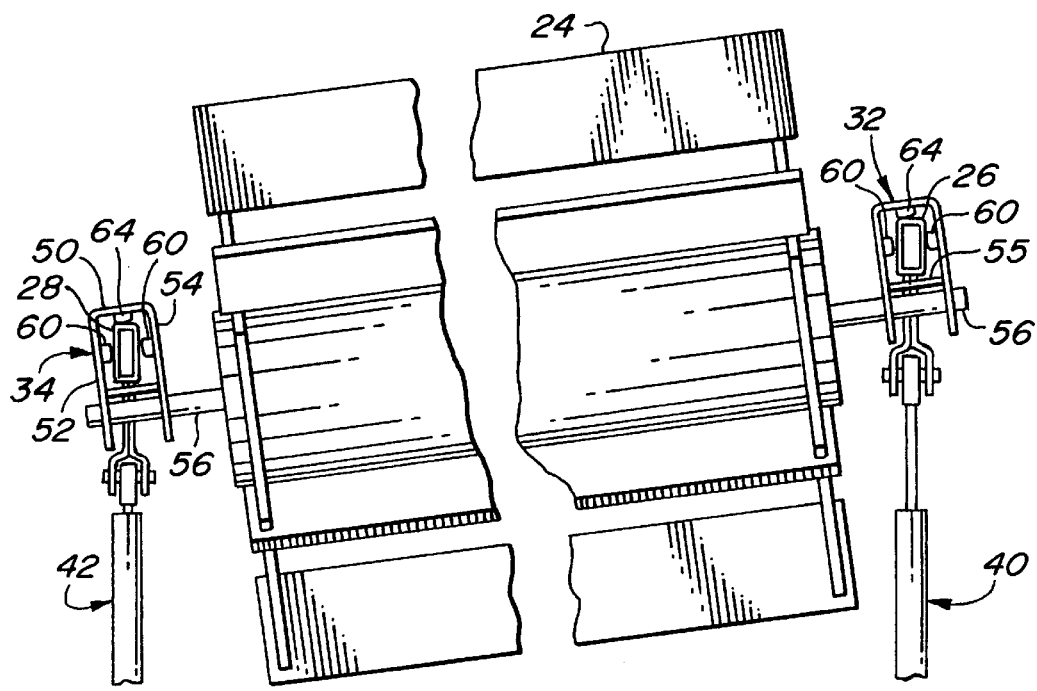
FIG. 3 is a front schematic view like FIG. 2 illustrating one support arm raised during initial charging of the controlling cylinder.

The non-binding reel mount of the present invention enables the reel to be tilted as shown in FIG. 3 without the reel mounting brackets binding on the reel support arms. The reel support arms 26, 28 are generally rectangular in section, having top, bottom and side surfaces. The reel mounting brackets 32, 34 in turn have a top wall 50 and spaced sidewalls 52, 54 that are wrapped around the top and side surfaces of the reel support arms. The reel mounting brackets also typically have a cross member 55 beneath the support arm. The sidewalls 52, 54 extend downward below the reel support arms to rotatably support the pivot shaft 56 of the reel 24. The reel may also be supported above the reel support arms.

The sidewalls 52, 54 of the mounting brackets 32, 34 are spaced from the side surfaces of the reel support arms to provide clearance for the mounting brackets to rotate relative to the support arms when one end of the reel is lifted as shown in FIG. 3. This enables the controlling cylinder 40 to be fully extended before any extension of the controlled cylinder 42 without causing binding between the support arms and the mounting brackets.

Figure 5:
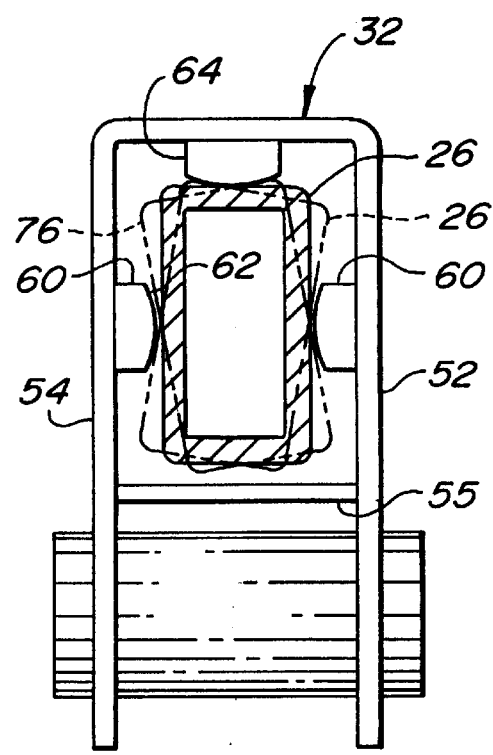
FIG. 5 is an enlarged front schematic view of the non-binding reel mount illustrating the twisting motion of the mounting bracket relative to the reel support arm.

Side bushings 60 are placed between the sidewalls of each mounting bracket and the respective reel support arm to prevent lateral movement or shifting of the mounting brackets relative to the support arms. The bushings are disposed along the center of the reel support arms to enable rotation of the mounting brackets relative to the support arms as shown in FIG. 5. The inner engagement surface 62 of the side bushings is crowned or rounded to facilitate the rotation of the mounting brackets.

A top bushing 64 is provided between the upper surface of the reel support arms and the top wall 50 of the mounting brackets. The top bushing 64 bears the weight of the reel upon the reel support arms and facilitates sliding motion of the reel mounting brackets along the reel support arms. The bushings are preferably molded of an actual resin such as Delrin. To reduce part complexity and to facilitate assembly, the top and side bushings are preferably identical.

Figure 7:
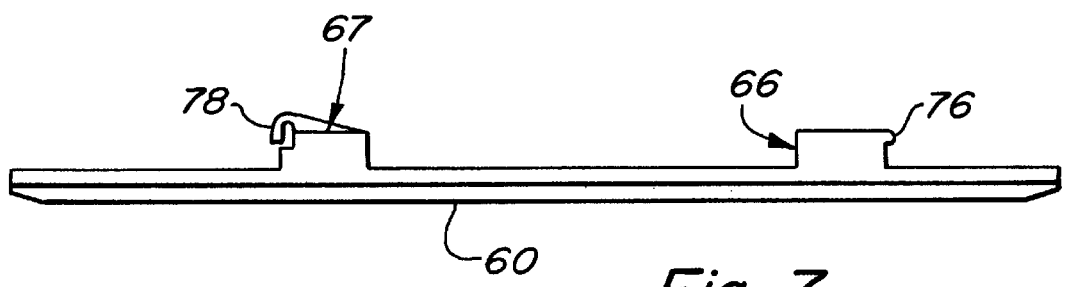
FIG. 7 is a side view of one bushing showing features for retaining the bushing in place in the reel mounting bracket prior to installation of the reel support arm.

The side and top bushings are retained in place by studs 66, 67 that project through apertures 68 in the top wall 50 and the sidewalls 52, 54 of the mounting bracket. Once the reel support arm is in place, there is not enough clearance for the bushing studs to be removed from the apertures, thereby retaining the bushings in place. The studs preferably have features to retain the bushings in place in the mounting bracket before the reel support arm is in place. These features are shown in FIG. 7. The stud 66 includes a ridge 76 along a front edge that fits over the outer edge of the aperture 68 in the mounting bracket. The stud 67 in turn includes a rearward facing resilient tab 78 that fits over the outer edge of the respective aperture 68. The ridge 76 and the tab 78 hold the bushing in place during assembly, before the mounting bracket is placed on the support arm.

Figure 4:
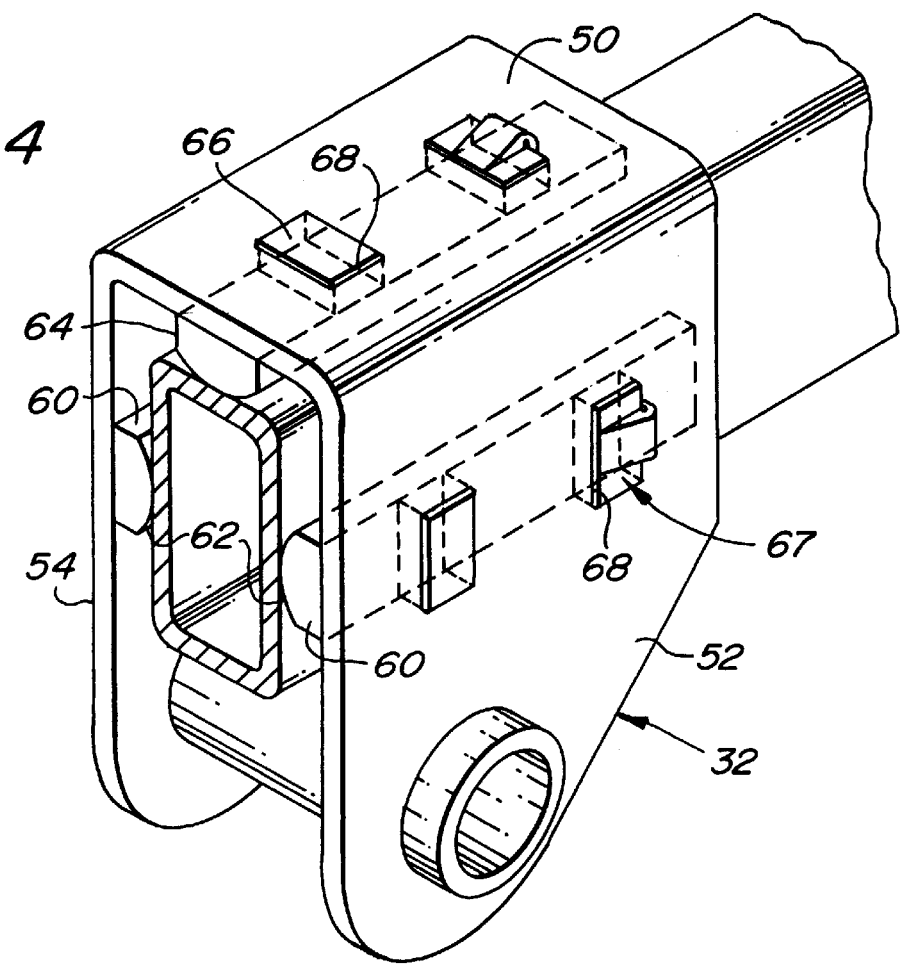
FIG. 4 is an enlarged perspective view of the non-binding reel mount of the present invention.
Figure 6:
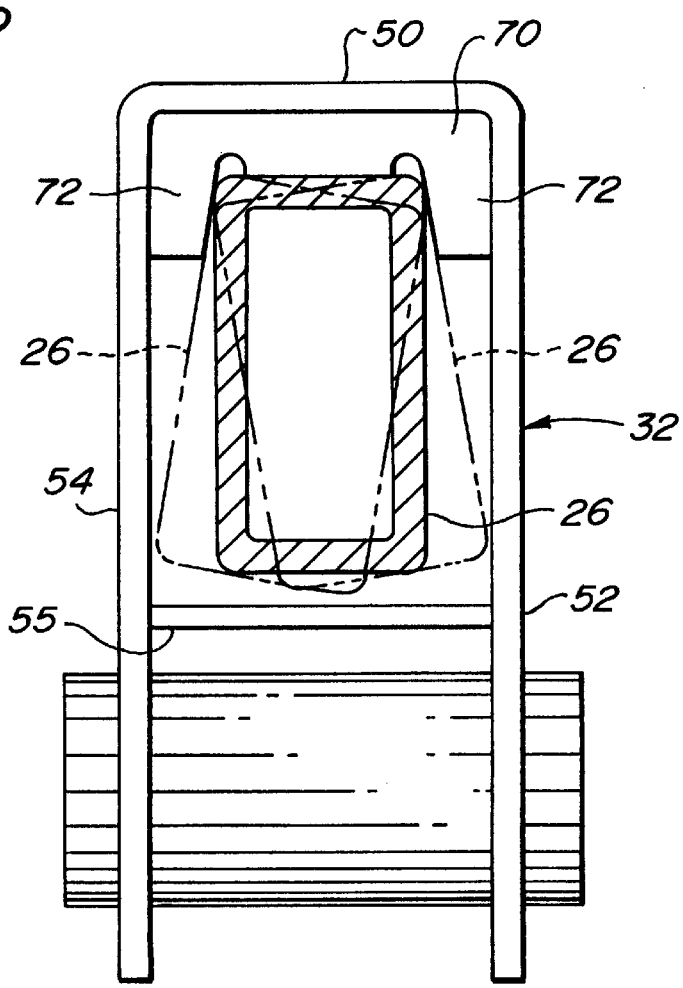
FIG. 6 is a front schematic view of an alternative embodiment of the non-binding reel mount of the present invention.

An alternative embodiment of the invention is shown in FIG. 6. There the support arm 26 and mounting bracket 32 are the same as the previous embodiment. A single, larger top bushing 70 has replaced the three separate side and top bushings. The bushing 70 covers the top of the support arm and extends between the two sidewalls 52, 54 of the mounting bracket. The bushing 70 includes corner portions 72 that wrap around the upper corners of the support arm 26. The bushing provides support to prevent lateral shifting of the reel. The corner portions 72 enable rotation of the mounting bracket relative to the support arm about an axis near the top of the support arm. The bushing 70 extends longitudinally along the support arm like the bushings 60, 64 shown in FIG. 4. One or more upwardly projecting studs are provided to retain the bushing 70 in the mounting bracket in the same manner as the studs 66, 67 described above.

The reel mount of the present invention enables one lift cylinder to be fully extended before any extension of the other cylinder without causing binding between the reel mounting brackets and the reel support arms. The reel mount can be designed to provide any desired amount of vertical movement of the reel 24. The lift cylinders 40, 42 need to be charged initially at the time of manufacture of the platform and may need to be charged during the life of the platform following service operations on the platform hydraulic system.

The invention should not be limited to the above-described embodiment, but should be limited solely by the claims that follow.

We claim:

1. A harvesting platform comprising:
   a frame having laterally spaced ends;
   a reel support arm pivotally mounted to the frame at each end thereof, the reel support arms being rectangular in section having top, side and bottom surfaces;
   a hydraulic lifting cylinder between each reel support arm and the frame, including a controlling cylinder lifting one reel support arm and a controlled cylinder lifting the other reel support arm whereby during initial filling of the cylinders with fluid, the controlling cylinder is first filled and extended before the controlled cylinder is filled and extended lifting one of the reel support arms before the other reel support arm is lifted;
   a reel mounting bracket slidably carried by each reel support arm, the reel mounting brackets each having a top wall and two sidewalls wrapped around the top and side surfaces of the respective reel support arm, the sidewalls being spaced from the side surfaces of the reel support arms to enable rotation of the reel mounting brackets relative to the reel support arms;
   a reel mounted on the reel mounting brackets and spanning between the reel support arms; and
   at least one bushing between each mounting bracket and each support arm and coupled to the respective mounting bracket to move therewith, the at least one bushing facilitating sliding motion of the mounting brackets on the support arms and preventing lateral shifting of the mounting brackets on the support arms while the clearance between the support arms and the mounting brackets permits rotation of the mounting brackets relative to the support arms.

2. The harvesting platform as defined by claim 1 wherein the at least one bushing between each mounting bracket and each support arm includes a top bushing between the top wall of each mounting bracket and the top surface of each support arm and side bushings between the sidewalls of each mounting bracket and the side surfaces of each support arm at approximately a center line of each support arm.

3. The harvesting platform as defined by claim 1 wherein the at least one bushing between the mounting bracket and the support arm includes a single bushing at the top of the support arm extending between the two sidewalls of the mounting bracket and wrapping around upper corners of the support arm.

4. The harvesting platform as defined by claim 1 wherein the at least one bushing is molded of an acetal resin.

5. A harvesting platform comprising:
   a frame having laterally spaced ends;
   a reel support arm pivotally mounted to the frame at each end thereof, the reel support arms being rectangular in section having top, side and bottom surfaces;
   a hydraulic lifting cylinder between each reel support arm and the frame, including a controlling cylinder lifting one reel support arm and a controlled cylinder lifting the other reel support arm whereby during initial filling of the cylinders with fluid, the controlling cylinder is first filled and extended before the controlled cylinder is filled and extended lifting one of the reel support arms before the other reel support arm is lifted;

a reel mounting bracket slidably carried by each reel support arm, the reel mounting brackets each having a top wall and two sidewalls wrapped around the top and side surfaces of the respective reel support arm, the sidewalls being spaced from the side surfaces of the reel support arms to enable rotation of the reel mounting brackets relative to the reel support arms;

a reel mounted on the reel mounting brackets and spanning between the reel support arms; and a top bushing between the upper surface of each reel support arm and the top wall of each reel mounting bracket and side bushings between the side surfaces of each reel support arm and the sidewalls of each reel mounting bracket at a center line of each reel support arm, the top and side bushings being coupled to the mounting bracket to move therewith to facilitate sliding motion of the mounting bracket whereby the mounting brackets are restrained from moving laterally relative to the reel support arms while remaining able to rotate about the reel support arms.

6. The harvesting platform as defined by claim 5 wherein the side bushings have a rounded contact surface engaging the reel support arms.

7. The harvesting platform as defined by claim 5 wherein the bushings are molded of an acetal resin.

8. A harvesting platform comprising:

a frame having laterally spaced ends;

a reel support arm pivotally mounted to the frame at each end thereof, the reel support arms being rectangular in section having top, side and bottom surfaces;

a hydraulic lifting cylinder between each reel support arm and the frame, including a controlling cylinder lifting one reel support arm and a controlled cylinder lifting the other reel support arm whereby during initial filling of the cylinders with fluid, the controlling cylinder is first filled and extended before the controlled cylinder is filled and extended lifting one of the reel support arms before the other reel support arm is lifted;

a reel mounting bracket slidably carried by each reel support arm, the reel mounting brackets each having a top wall and two sidewalls wrapped around the top and side surfaces of the respective reel support arm, the sidewalls being spaced from the side surfaces of the reel support arms to enable rotation of the reel mounting brackets relative to the reel support arms;

a reel mounted on the reel mounting brackets and spanning between the reel support arms; and a single bushing at the top of each support arm extending between the two sidewalls of each mounting bracket and wrapping around upper corners of each support arm, the bushing being coupled to the mounting bracket to move therewith to facilitate sliding motion of the respective mounting bracket whereby the mounting brackets are restrained from moving laterally relative to the reel support arms while remaining able to rotate about the reel support arms.

9. A harvesting platform comprising:

a frame having laterally spaced ends;

a reel support arm pivotally mounted to the frame at each end thereof, the reel support arms being non-circular in section;

a hydraulic lifting cylinder between each reel support arm and the frame;

a reel mounting bracket slidably carried by each reel support arm, the reel mounting brackets being of a size and shape to enable rotation of the reel mounting brackets relative to the reel support arms about a longitudinal axis of the reel support arms;

a reel mounted on the reel mounting brackets and spanning between the reel support arms; and at least one bushing between each mounting bracket and each support arm and coupled to the respective mounting bracket to move therewith, the at least one busing facilitating sliding motion of the mounting brackets on the support arms and preventing lateral shifting of the mounting brackets relative to the reel support arms.

10. The harvesting platform as defined by claim 9 wherein the reel support arms are generally rectangular in section having top and side surfaces and wherein the mounting brackets have a top wall and two sidewalls wrapped around the top and side surfaces of the respective reel support arms.

11. The harvesting platform as defined by claim 10 comprising three bushings between each reel mounting bracket and the respective reel support arm with one bushing between the top surface of the reel support arm and the top wall of the reel mounting bracket and one bushing between each side surface of the reel support arm and each side wall of the reel mounting bracket.

* * * * *